United States Patent Office 3,733,400
Patented May 15, 1973

---

3,733,400
DIGESTIVE TRACT PROTECTING COMPOSITIONS
André Queuille, Noisy le Sec, and Robert Fournex, Paris, France, assignors to Roussel-UCLAF, Paris, France
No Drawing. Filed Jan. 26, 1971, Ser. No. 109,989
Claims priority, application France, Feb. 5, 1970, 7004075
Int. Cl. A61k 27/00
U.S. Cl. 424—81     4 Claims

ABSTRACT OF THE DISCLOSURE

Digestive tract protecting compositions containing as the active ingredient at least one polymer selected from the group consisting of homopolymers of acrylamide and methacrylamide, copolymers of acrylamide and acrylic acid and copolymers of methacrylamide and methacrylic acid and to methods of treating or preventing ulcers or inflammation of large intestine in warm-blooded animals.

OBJECTS OF THE INVENTION

It is an object of the invention to provide novel therapeutic compositions for the treatment or prevention of ulcers or inflammation of large intestine.

It is another object of the invention to provide a novel method of preventing or treating ulcers or inflammation of large intestine in warm-blooded animals.

These and other objects and advantages of the invention will become obvious from the following detailed description.

THE INVENTION

The novel digestive trace protecting compositions are comprised of an effective amount of at least one polymer selected from the group consisting of homopolymers of acrylamide and methacrylamide, copolymers of acrylamide and acrylic acid and copolymers of methacrylamide and methacrylic acid as the active ingredient and a pharmaceutical carrier. The compositions may be in the form of gels, suspensions, granules, aromatic powders or sachets diluted with water. The usual individual dose is 1 to 5 g.

Examples of suitable polymers useful in the compositions of the invention are homopolymers of acrylamide sold under the marks Separan NP10, Separan NP20, Purifloc N12 and Purifloc N17; copolymers of acrylamide and acrylic acid sold under the marks Separan AP30, Polyteric EN4 or Polyteric AS3.

The polymers used in the invention are colorless solids having a molecular weight from about 10,000 to 3,000,000. The molecular weight of Separan NP10 is about 1,000,000, of Separan AP30 is about 2,000,000 to 3,000,000. The polymers in a concentration of 1% in water at a neutral pH and at room temperature have a very high viscosity of about 1000 to 40,000 centipoises. The viscosity of the solutions will ordinariily vary depending upon the pH, temperature and concentration.

The apparent density for the polymers of the Separan type is about 0.55 g. per cc. and 95% of the particles have a diameter less than 1 mm. The polyacrylamides of the Separan type soften at 220–230° C. and decompose at 270° C.

The polymers use in the compositions dissolve in water in all proportions, however, the solutions having a concentration greater than 1% are difficult to prepare as they have a high viscosity. They are insoluble in ether, benzene, chloroform and hexane and swell in glycerine and ethylene glycol.

The polymeric amides of the compositions of the invention will undergo the reactions of amide compounds such as hydrolysis with a strong base to form an alkaline carboxylate with evolution of ammonia, hydrolysis with a strong acid to form a carboxylic acid and an ammonium salt, reduction with an alkaline hypobromite in the Hofmann reaction to obtain a primary amine with evolution of carbon dioxide gas and finally reaction with formaldehyde in an alkaline medium to obtain a N-methylol derivative.

The therapeutic compositions of the invention have interesting pharmacological properties, and show a protective effect on gastric mucous membranes against hydrochloric acid hyperactivity, against pepsic hyperactivity and against the ulcergenic activity of anti-inflammatories. They are useful in human or veterinary medicine for the treatment of organic syndromes or functions with hypersecretion, for the treatment of gastric or duodeno ulcers caused by hydrochloric acid hypersecretion or pepsic hyperactivity or after use of anti-inflammatory agents or for the treatment of hyperhydrochloric acid gastritis. When used by rectal way they can be employed for the treatment of proctitis.

The compositions have the advantage of being completely non-toxic and may be used in association with other active principles such as aluminum salts, bismuth salts, kaolin, anesthetics, antalgics, antipepsics or antispasmodics.

The novel method of the invention for the treatment or prevention of ulcers or inflammation of large intestine in warm-blooded animals comprises administering to warm-blooded animals an effective amount of at least one polymer selected from the group consisting of homopolymers of acrylamide and methacrylamide, copolymers of acrylamide and acrylic acid and copolymers of methacrylamide and methacrylic acid. The polymers may be administered orally or rectally and the usual daily dose is 15 to 200 mg./kg. depending upon the method of administration.

In the following examples there are described several preferred embodiments to illustrate the invention. However, it should be understood that the invention is not intended to be limited to the specific embodiments.

EXAMPLE I

Granules: | G.
--- | ---
Separan NP10 (commercial polyamide-molecular weight about 1,000,000) | 20
Sodium cyclohexylsulfamate | 0.12
Sodium saccharinate | 0.06
Solid and liquid perfumes | 0.70
Semolina sugar, Q.s. to 100. |

The mixture of Separan NP10 and the solid products were dried. Solution of the liquid portion of perfume in the minimal amount of alcohol as 80 percent was pulverized over the powdered mixture. The mixture was dried in an oven and passed through a sieve. The granules could be used as is such or could be distributed in sachets of 10 g.

EXAMPLE II

Complex granules: | G.
--- | ---
Separan NP10 | 20
Bismuth oxynitrate | 20
Sodium cyclohexylsulfamate | 0.12
Sodium saccharinate | 0.06
Solid and liquid perfumes | 0.70
Semolina sugar, Q.s. to 100. |

The complex granules were prepared in the same manner as the simple granules of Example I.

EXAMPLE III

Complex granules

The complex granules of Example III were prepared as in Example II, but 0.005 g. of atropine sulfate was added to the formulation.

EXAMPLE IV

Effervescent granules:                                      G.
Separan NP10 _____ 20
Sodium saccharinate _____ 0.06
Sodium cyclohexylsulfamate _____ 0.12
Citric acid _____ 2
Sodium bicarbonate _____ 4
Solid perfume _____ 1.20
Quinoleine yellow _____ 0.06
Semolina sugar, Q.s. to 100.

EXAMPLE V

Gels:                                                       G.
Separan NP20 (polyamide-molecular weight of about 2,000,000–3,000,000) _____ 1.0
Methyl p-hydroxybenzoate (U.S.P.) _____ 0.12
Propyl p-hydroxybenzoate (U.S.P.) _____ 0.03
Sodium meta bisulfite _____ 0.10
Perfume, Q.s.
Water, Q.s. to 100 cc.

EXAMPLE VI

Aromatic sachets:                                           G.
Separan NP10 _____ 1.0
Pineapple "polvaromas" (international flavors and fragrances:IFF) _____ 0.02
Vanilla "polvaromas" (IFF) _____ 0.10
Microcrystalline cellulose (Avicel Rc) _____ 0.15
Semolina sugar _____ 4.75

Preparation is carried by mixing the constituents to obtain an aromatized powder produced in sachets divided in doses.

EXAMPLE VII

Sachets:
Separan NP10 _____ g__ 2
Phuoronic F68 _____ mg__ 60
Lemon-lime "polvaromas" (IFF) _____ mg__ 24
Lemon "polvaromas" (IFF) _____ mg__ 44
Glazed sugar, Q.s. to 6 g.

The powders are mixed by successive dilutions.

PHARMACOLOGICAL STUDY OF SEPARAN NP10

(A) Anti-ulceric activity

The anti-ulceric activity of Separan NP10 was determined on rats using the technique of Bonfils [C.R. Soc. Biol. vol. 150 (1956), p. 2124]. The animals were immobilized for 24 hours on a flexible grill of fine mesh and 4 holes were pierced in location of the paws. The paws were attached two by two with adhesive tape and 2.5 cc. of physiological serum was injected into each rear paw. The test product was orally administered as a suspension in water containing 5% of gum. At 14 hours in the first day, the animal received 300 mg./kg. of the test compound immediately before restraining the animal. In the morning of the second day, the animal received 300 mg./kg. of the test product and in the evening of the second day, the animal was sacrificed and autopsied. The stomach was examined microscopically to determine the superficiality of the lesions. The ulceration indices were determined as a function of surface and intensity of the lesions. The results were determined in two tests and the results are reported in Table I.

TABLE I

| Groups | Dose in mg./kg. | Ulceration indice | Percent of protection |
|---|---|---|---|
| Control | 0 | 11.2 | |
| Treated | 2×300 | 8.8 | 21 |
| Control | 0 | 11.6 | |
| Treated | 2×300 | 8.3 | 28 |

In a second test, at 14 hours of the first day the animal received 300 mg./kg. of the test product immediately before constraint of the animal. On the morning of the second day, the animal received a second dose of 300 mg./kg. and in the 14th hour of the same day, the animal was freed and received in the evening a third dose of 300 mg./kg. On the morning of the third day, the animal was sacrificed and autopsied and the indice of ulceration was determined as before. The tests were run twice and the results are shown in Table II.

TABLE II

| Groups | Dose in mg./kg. | Ulceration indice | Percent of protection |
|---|---|---|---|
| Control | 0 | 11 | |
| Treated | 3×300 | 2.1 | 81 |
| Control | 0 | 17.1 | |
| Treated | 3×300 | 10.4 | 39 |

(B) Preventative and curative treatment of ulcers

In the morning and evening of the first and second day, each animal received orally 300 mg./kg. of the test product as a suspension in water containing 5% gum. On the morning of the third day, the animals received 300 mg./kg. of phenylbutazone and 300 mg./kg. of the test compound in the morning and evening. On the fourth day, the animals received another 300 mg./kg. of the test product and on the morning of the fifth day, the animals were killed and autopsied to determine the indice of ulceration as before. The tests were run twice and the results are reported in Table III.

TABLE III

| Groups | Dose in mg./kg. | Ulceration indice | Percent of protection |
|---|---|---|---|
| Control | 0 | 5.1 | |
| Treated | 6×300 | 2.8 | 45 |
| Control | 0 | 3.5 | |
| Treated | 6×300 | 1.9 | 45 |

(C) Curative treatment of ulcers

On the morning of the first day, rats received orally 300 mg./kg. of phenylbutazone and 300 mg./kg. of test product; in the evening, the animals received 300 mg./kg. of the test product. In the morning and evening of the second day, the animals received 300 mg./kg. of the test product and on the morning of the third day, the animals were killed and autopsied as before. The results are reported in Table IV.

TABLE IV

| Groups | Dose in mg./kg. | Ulceration indice | Percent of protection |
|---|---|---|---|
| Control | 0 | 13.5 | |
| Treated | 4×300 | 8.0 | 41 |

The results of the said tables show that the test product has an important anti-ulceric effect against ulcers of constraint and ulcers provoked by phenylbutazone.

(D) Acute toxicity determination

The acute toxicity tests were effected on groups of 10 male mice weighing about 20 g. and Separan NP10 was orally administered in increasing doses as a suspension in water containing 5% gum. The $DL_{50}$ (mean lethal dose) was determined by the Karber method after 8 days of observation and under these conditions, the $DL_{50}$ was greater than 2 g./kg.

CLINICAL STUDY

Sachet compositions containing 2 gm. of Separan NP10 were administered 2 to 3 times a day to 80 clinical cases and it was concluded that the product was well accepted, well tolerated and was active in treatment of medicinal and toxic gastritis, gastro-duodeno ulcers, hiatal hernias and proctitis.

Various modifications of the compositions and method of the invention may be made without departing from the spirit or scope thereof and it is to be understood that the invention is to be limited only as defined in the appended claims.

We claim:

1. A method of treating ulcers in warm-blooded animals comprising administering orally or rectally to warm-blooded animals having ulcers an effective anti-ulcergenic amount of at least one polymer selected from the group consisting of homopolymers of acrylamide and methacrylamide, copolymers of acrylamide and acrylic acid and copolymers of methacrylamide and methacrylic acid, all having a molecular weight from about 10,000 to 3,000,000 and a viscosity of 1000 to 40,000 centipoises at a concentration of 1% in water at a neutral pH and at room temperature.

2. The method of claim 1 wherein the polymer is administered orally.

3. A method of treating inflammation of large intestine in warm-blooded animals comprising administering orally or rectally to warm-blooded animals having inflammation in the large intestine an anti-inflammatorily effective amount of at least one polymer selected from the group consisting of homopolymers of acrylamide and methacrylamide, copolymers of acrylamide and acrylic acid and copolymers of methacrylamide and methacrylic acid, all having a molecular weight from about 10,000 to 3,000,000 and a viscosity of 1000 to 40,000 centipoises at a concentration of 1% in water at a neutral pH and at room temperature.

4. The method of claim 3 wherein the polymer is administered rectally.

References Cited

UNITED STATES PATENTS

| | | | |
|---|---|---|---|
| 2,909,462 | 10/1959 | Warfield et al. | 424—81 |
| 2,912,358 | 11/1959 | Staib, Jr. | 424—81 |
| 3,072,536 | 1/1963 | Pye | 424—81 |
| 3,390,050 | 6/1968 | Speiser | 424—81 |

ALBERT T. MEYERS, Primary Examiner

F. E. WADDELL, Assistant Examiner